United States Patent
Licht et al.

(12) 
(10) Patent No.: US 6,354,285 B1
(45) Date of Patent: Mar. 12, 2002

(54) ATTACHMENT FOR A DICING SAW

(75) Inventors: Oded Yehoshua Licht; Yaacov Lagerbaum, both of Haifa (IL)

(73) Assignee: Kulicke & Soffa Investments, Inc., Wilmington, DE (US)

( * ) Notice: Subject to any disclaimer, the term of this patent is extended or adjusted under 35 U.S.C. 154(b) by 0 days.

(21) Appl. No.: 09/546,671

(22) Filed: Apr. 11, 2000

(30) Foreign Application Priority Data

Feb. 23, 2000 (IL) .................................................. 134693

(51) Int. Cl.⁷ ................................................ B26D 7/18
(52) U.S. Cl. ................................ 125/13.01; 125/16.01; 83/165
(58) Field of Search .......................... 125/13.01, 16.01, 125/16.02, 14; 83/100, 165, 168

(56) References Cited

U.S. PATENT DOCUMENTS

| | | | | |
|---|---|---|---|---|
| 3,935,775 A | * | 2/1976 | Sato .......................... | 83/165 X |
| 4,300,421 A | * | 11/1981 | Yano et al. ................. | 83/100 X |
| 4,428,159 A | * | 1/1984 | Sigetich et al. ........ | 125/13.03 X |
| 4,501,177 A | * | 2/1985 | Logan et al. ............. | 83/165 X |
| 5,156,075 A | * | 10/1992 | Campbell, Jr. et al. ....... | 83/100 |
| 5,461,008 A | * | 10/1995 | Sutherland et al. .......... | 437/226 |
| 5,894,773 A | * | 4/1999 | Sevenisn et al. ........... | 83/100 X |
| 6,164,881 A | * | 12/2000 | Shono ....................... | 83/100 X |

* cited by examiner

Primary Examiner—Derris H. Banks
Assistant Examiner—Anthony Ojini
(74) Attorney, Agent, or Firm—Barry R. Lipsitz; Douglas M. McAllister

(57) ABSTRACT

An attachment for a dicing saw having a housing, a carriage mounted in the housing, a bellows coupled to the carriage, and at least one drainage channel in the housing, the attachment including a collector for automatically collecting debris and fallen dice during operation of the dicing saw.

There is also provided a method for cleaning a dicing saw having a housing, a carriage mounted in the housing, a bellows coupled to the carriage, and at least one drainage channel in the housing, the method including the steps of automatically collecting debris and fallen dice in a collector during operation of the dicing saw.

17 Claims, 3 Drawing Sheets

ATTACHMENT FOR A DICING SAW

FIELD OF THE INVENTION

The present invention relates to dicing saws in general and, in particular, to dicing saws for dicing BGA (ball grid array) type package panels.

BACKGROUND OF THE INVENTION

Dicing saws for a variety of purposes, in particular for dicing and singulation of BGA type package panels, are well known in the art. These saws generally include a reciprocating carriage which passes under a rotating saw blade held by a spindle. The carriage is slidably mounted on a slide for movement along a pair of tracks. Cooling water is sprayed onto the blade during dicing, and collects in two channels in the bottom of the housing of the dicing machine, one on each side of the carriage. One channel includes a water outlet, and the second channel is connected to the first for drainage.

In order to protect the slide from the cooling water sprayed on the saw blade and from scrap and debris from the sawing process, a bellows is provided extending over the tracks from the carriage to the housing which folds and expands as the carriage reciprocates along the tracks. However, it has been found that conventional bellows do not provide sufficient protection for the slide. During the dicing process, small pieces, and occasionally singulated dice, fly off the package being cut, and fall between folds of the bellows. These pieces are very sharp and cut the bellows when the bellows close tightly on them during reciprocation of the carriage. Once the bellows have been cut, water and debris can fall through the bellows and damage the slide.

Other pieces of debris and some dice from the dicing process fall onto the carriage cover extending horizontally from the sides of the carriage, or into the water drainage channels. Those on the carriage cover remain there until removed manually. Some of the debris which falls into the drainage channels flows with the water into the drain, and can cause clogging. Most of the pieces remain in the dicing machine, in many different locations on the floor of the housing. In order to permit the dicing machine to function properly, it must be shut down every hour or two, and a worker must manually collect all the slivers, pieces, and other debris from the housing, and throw them away, and save any usable dice which have fallen into the housing. This is a time consuming, awkward and sometimes dangerous process, and requires shutting down the machine at very frequent intervals, often every hour.

Accordingly, there is a long felt need for an apparatus and method for automatically collecting debris from a dicing machine, and it would be very desirable to have such an apparatus and method which both protects the bellows cover and permits easy collection of debris falling to the sides of the carriage.

SUMMARY OF THE INVENTION

According to the present invention, there is provided an attachment for a dicing saw having a housing, a carriage mounted in the housing, a bellows coupled to the carriage, and at least one drainage channel in the housing, the attachment including a collector for automatically collecting debris and fallen dice during operation of the dicing saw.

According to one embodiment of the invention, the collector includes a bellows protecting cover and a receptacle coupled to the housing and arranged automatically to receive debris and fallen dice from the dicing saw during operation.

Further according to one embodiment of the invention, the collector further includes a sloping skirt coupled to each side of the carriage and angled downwards towards a drainage channel.

Still further according to one embodiment of the invention, the collector includes a sloping floor mounted in the drainage channel, ending adjacent the receptacle.

According to a preferred embodiment, the attachment further includes an inlet nozzle for pressurized fluid for urging fallen scrap, debris, and singulated dice into the drainage channel.

There is also provided a method for cleaning a dicing saw having a housing, a carriage mounted in the housing, a bellows coupled to the carriage, and at least one drainage channel in the housing, the method including the steps of automatically collecting debris and fallen dice in a collector during operation of the dicing saw.

According to a preferred embodiment, the step of collecting includes mounting a bellows protecting cover over the bellows, and causing debris falling on the bellows protecting cover to fall into a receptacle coupled to the housing.

BRIEF DESCRIPTION OF THE DRAWINGS

The present invention will be further understood and appreciated from the following detailed description taken in conjunction with the drawings in which.

DESCRIPTION OF THE INVENTION

The present invention relates to a device for automatically collecting debris, scrap, and fallen dice (hereinafter referred to as "debris") from a dicing saw, instead of the manual cleaning method in use at present. The device of the present invention significantly reduces down time of the dicing saw, prevents damage to the bellows and slide, and permits rapid and efficient cleaning of the housing of the dicing saw.

Figure 1:
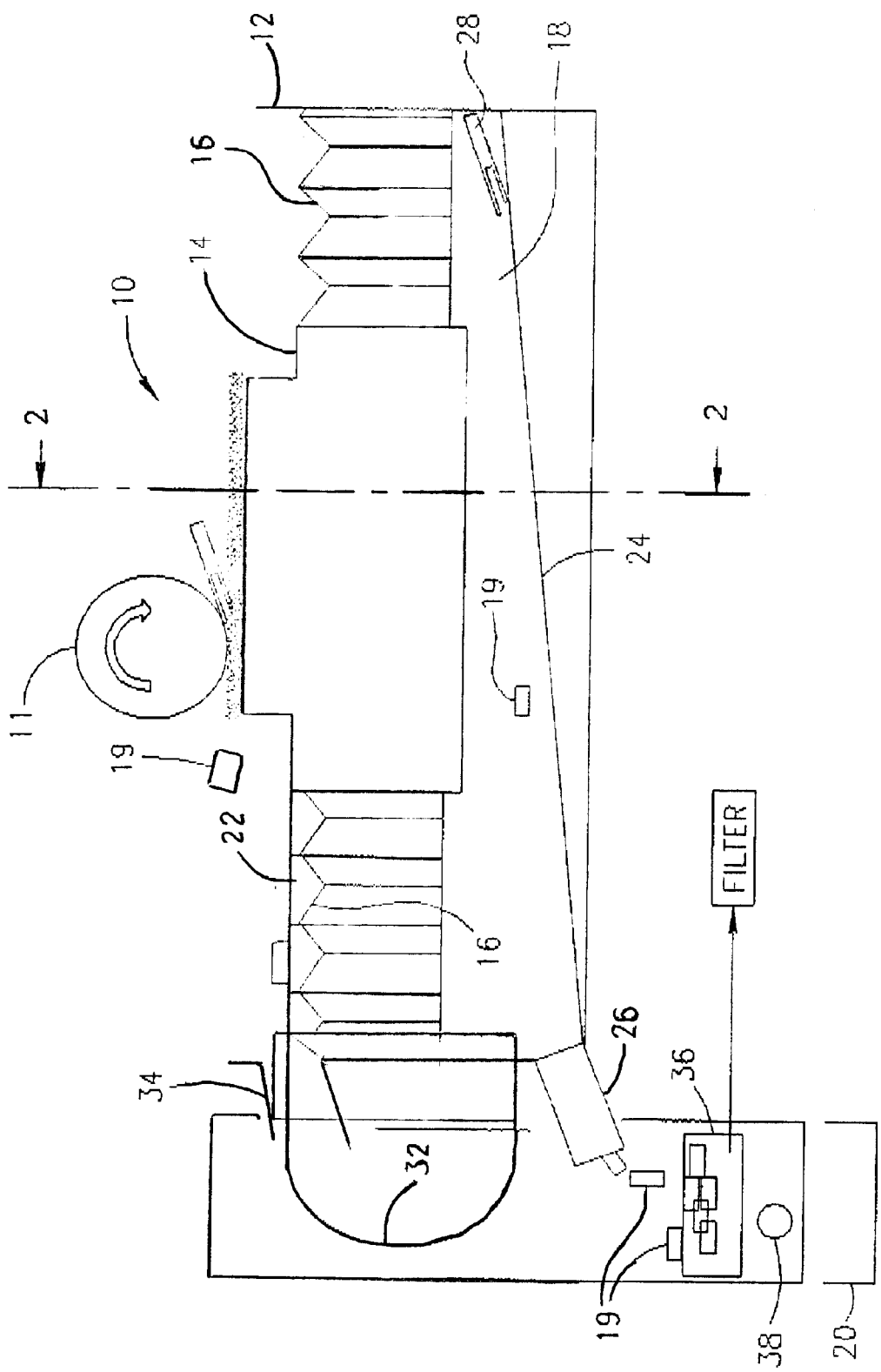
FIG. 1 is a schematic side sectional view of a device for collecting debris from a dicing saw constructed and operative in accordance with one embodiment of the invention.

Referring to FIG. 1, there is shown a schematic side sectional view of a device for collecting debris from a dicing saw 10, constructed and operative in accordance with one embodiment of the invention. Typically, dicing saw 10 includes a housing 12, a reciprocating X carriage 14 mounted in housing 12, and a bellows 16, typically formed of plastic, coupled to the carriage to protect the slide and tracks of the carriage 14. At least one, and preferably two flat bottom drainage channels 18 are formed in the bottom of the housing of the dicing machine, one on each side of the carriage The device of the present invention includes a collector for automatically collecting slivers, pieces of material being diced, and other scrap or debris 19, as well as occasional singulated dice, which are released by the dicing saw and fall within the housing. The collector preferably includes several elements—a receptacle or debris container, a bellows protecting cover, and means to cause the debris to move from the housing into the debris container. Most preferably, the collector also includes a sloped floor 24 in each drainage channel 18.

In the embodiment of FIG. 1, a receptacle or debris container 20 is illustrated as a chamber coupled to housing 12. A bellows protecting cover 22 is mounted on carriage 14 and extends above bellows 16 into debris container 20. According to a preferred embodiment of the invention, drainage channels 18 define a sloping floor 24 sloping downwardly towards the debris container. The ends of drainage channels 18, or floor 24, extend into debris container 20 or are provided with guide means 26 leading into debris container 20. Most preferably, an inlet nozzle 28 for pressurized fluid, such as a water jet or air jet, is provided at the upper end of the sloping floor 24 to provide pressurized fluid to urge fallen pieces and debris down sloping floor 24 into debris container 20. Alternatively, the nozzle can be provided on an edge of carriage 14, thereby providing a reciprocating fluid flow as the carriage moves.

Figure 2:
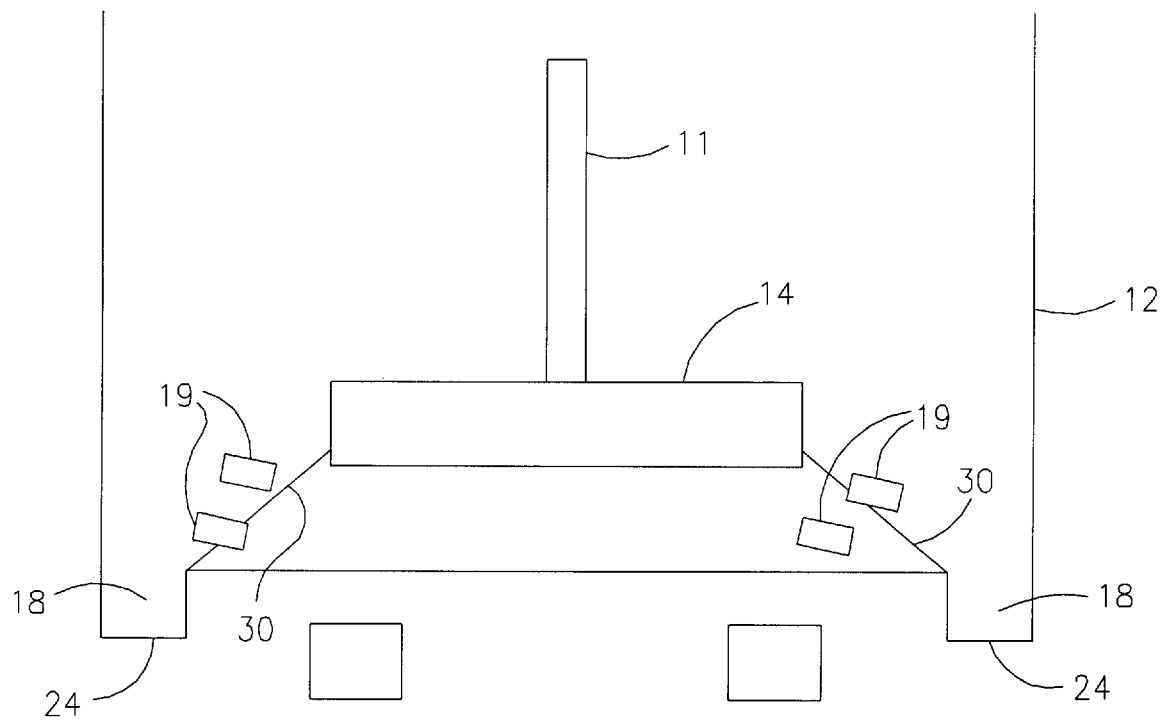
FIG. 2 is a schematic sectional view taken through line A—A in FIG. 1.

Since many pieces fall to the sides of the carriage during the dicing process, a sloping skirt 30 is coupled to each side of carriage 14, instead of the conventional horizontal carriage cover. Sloping skirts 30 are also sloped downwards towards the drainage channels 18, as seen in FIG. 2. In this way, the debris which falls on the sloping skirts 30 slips into the drainage channels 18. In addition, the cooling water sprayed on the dicing saw blade 11 helps to wash the debris down the sides of the skirts 30 and into the drainage channels 18.

Bellows protecting cover 22 is coupled to the moving X carriage 14 and extends above bellows 16 into debris container 20. As carriage 14 slides along its tracks during the dicing process, bellows protecting cover 22 catches any scrap and debris falling in the direction of the bellows 16 and guides it into debris container 20. Bellows protecting cover 22 can be formed of any suitable material, including, but not limited to, plastic, rubber, metal foil, and any conveyor belt material.

According to one embodiment of the invention, bellows protecting cover 22 is flexible yet semi-rigid, similar to a metallic measuring tape. Thus, when carriage 14 moves towards debris container 20, bellows protecting cover 22 bends around a track 32. As bellows protecting cover 22 bends, any debris which has fallen thereon will fall off into the debris container by the force of gravity. According to an alternative embodiment of the invention, bellows protecting cover 22 is substantially rigid and mounted at an angle, and debris container 20 is long enough to permit the entire bellows protecting cover to enter the debris container. A one way gate 34 can be provided to permit pieces of debris to enter the debris container 20 on bellows protecting cover 22 and to push the pieces off the bellows protecting cover when the carriage moves away from the debris container, thereby retracting the bellows protecting cover from debris container 20. According to yet another embodiment of the invention, another water jet or air jet is provided to push the debris off bellows protecting cover 22 into debris container 20.

According to a preferred embodiment of the invention, debris container 20 includes a removable drawer 36 or tray. Drawer 36 is formed of a screen material so that solid debris and fallen dice are entrapped therein, but water flows through the screen to a drain 38 in the bottom of debris container 20. When drawer 36 is full, the saw blade is turned off for a couple of minutes, drawer 36 is removed from debris container 20, and all the debris collected therein is disposed of. It is a particular feature of the present invention that the entire dicing saw need not be shut down in order to clean out the debris, and that the cleaning need not be carried out every hour, as in conventional dicing saws. Rather, the saw blade is turned off briefly, once a day, or as required depending on the size of the drawer and the quantities of debris generated during the dicing process, and the contents of the drawer disposed of.

Figure 3:
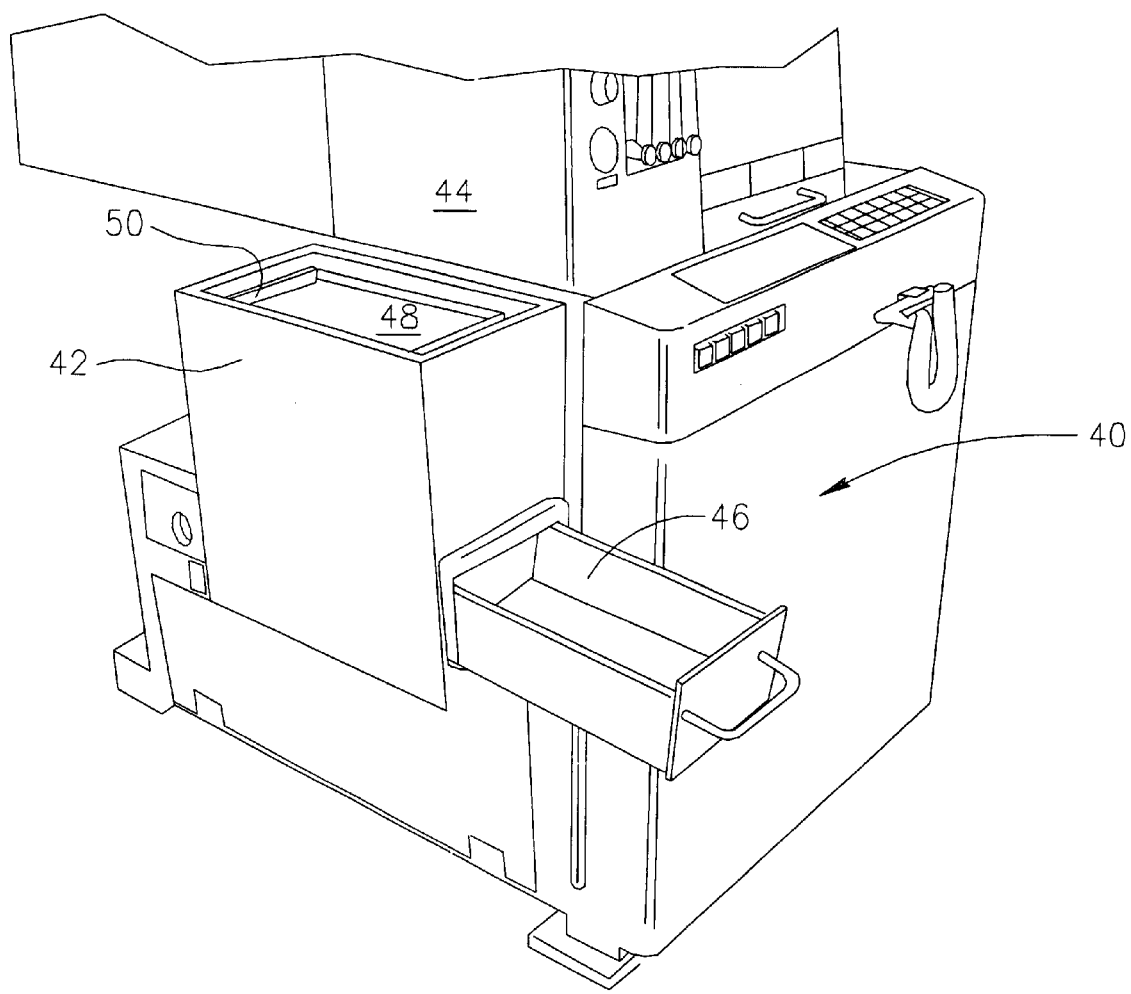
FIG. 3 is a perspective view of a dicing saw including a device for collecting debris according to one embodiment of the present invention.

Referring now to FIG. 3, there is shown a perspective view of a dicing saw 40 including a device for collecting debris according to one embodiment of the present invention. In this embodiment, debris container 42 is coupled to one side wall 44 of dicing saw 40. A screen drawer 46 is shown in the open orientation, illustrating the ease of cleaning the dicing saw, as opposed to conventional dicing machines. In this embodiment, a flexible bellows protecting cover 48 is provided, which curves around a track 50 mounted in debris container 42.

According to an alternative embodiment, the debris collecting drawer or strainer can be mounted outside the debris container. In this case, all the scrap, debris and water are removed from the dicing saw, and separation of water from scrap and dice is carried out outside the machine, or in a special drain.

It will be appreciated that the invention is not limited to what has been described hereinabove merely by way of example. Rather, the invention is limited solely by the claims which follow.

What is claimed is:

1. An attachment for a dicing saw including a housing, a reciprocating carriage mounted in the housing, a bellows coupled to the carriage, and at least one drainage channel in the housing, the attachment comprising:
    a collector for automatically collecting debris falling in the housing during operation of the dicing saw, wherein said collector includes:
        a bellows protecting cover mounted over the bellows and coupled to said carriage for movement therewith; and
        a receptacle coupled to the housing and arranged automatically to receive debris from the housing, drainage channel, and bellows protecting cover during operation of the dicing saw.

2. The attachment according to claim 1, further comprising a removable screen element in which debris is collected.

3. The attachment according to claim 1, further comprising a removable screen element in which debris is collected and wherein said removable screen element is mounted in said receptacle.

4. The attachment according to claim 1, further comprising a removable screen element in which debris is collected and wherein said removable screen element is mounted beneath said receptacle.

5. An attachment for a dicing saw including a housing, a reciprocating carriage mounted in the housing, a bellows coupled to the carriage, and at least one drainage channel in the housing, the attachment comprising:
    a collector for automatically collecting debris falling in the housing during operation of the dicing saw, wherein said collector includes a sloping skirt coupled to each side of the carriage and angled downwards towards a drainage channel.

6. An attachment for a dicing saw including a housing, a reciprocating carriage mounted in the housing, a bellows coupled to, the carriage, and at least one drainage channel in the housing, the attachment comprising:
    a collector for automatically collecting debris falling in the housing during operation of the dicing saw, wherein said collector includes a sloping floor mounted in each drainage channel, said sloping floor ending adjacent a receptacle.

7. The attachment according to claim 6, further including an inlet nozzle for pressurized fluid for urging debris into said receptacle and wherein said inlet nozzle is mounted adjacent said sloping floor.

8. An attachment for a dicing saw including a housing, a reciprocating carriage mounted in the housing, a bellows coupled to the carriage, and at least one drainage channel in the housing, the attachment comprising:
  a collector for automatically collecting debris falling in the housing during operation of the dicing saw; and
  an inlet nozzle for pressurized fluid for urging debris into a receptacle.

9. The attachment according to claim 8, wherein said inlet nozzle is mounted on said carriage.

10. The attachment according to claim 8, wherein said inlet nozzle is mounted adjacent a bellows protecting cover.

11. A method for cleaning a dicing saw having a housing, a reciprocating carriage mounted in the housing, a bellows coupled to the carriage, and at least one drainage channel in the housing, the method comprising the steps of:
  automatically collecting debris falling into the housing in a collector during operation of the dicing saw, wherein said step of collecting includes:
    mounting a bellows protecting cover over the bellows, said bellows cover being coupled to said carriage for movement therewith; and
    causing debris falling on said bellows protecting cover to fall into a receptacle coupled to the housing during movement of said carriage.

12. The method according to claim 11, wherein said step of collecting includes:
  mounting a sloping floor in each drainage channel; and
  causing debris falling on said sloping floor to slide into a receptacle coupled to the housing.

13. A method for cleaning a dicing saw having a housing, a reciprocating carriage mounted in the housing, a bellows coupled to the carriage, and at least one drainage channel in the housing, the method comprising the steps of:
  automatically collecting debris falling into the housing in a collector during operation of the dicing saw, wherein said step of collecting includes:
    coupling to the carriage a sloping skirt angled downwards towards the drainage channel; and
    causing debris falling on said sloping skirt to fall via said drainage channel into a receptacle coupled to the housing.

14. The method according to claim 13, further comprising the step of providing a pressurized fluid onto said sloping skirt to urge debris into said receptacle.

15. A method for cleaning a dicing saw having a housing, a reciprocating carriage mounted in the housing, a bellows coupled to the carriage, and at least one drainage channel in the housing, the method comprising the steps of:
  automatically collecting debris falling into the housing in a collector during operation of the dicing saw; and
  providing a pressurized fluid to urge debris into said collector.

16. The method according to claim 15, further comprising the step of providing a pressurized fluid onto a bellows protecting cover to urge debris into a receptacle.

17. A method for cleaning a dicing saw having a housing, a reciprocating carriage mounted in the housing, a bellows coupled to the carriage, and at least one drainage channel in the housing, the method comprising the steps of:
  automatically collecting debris falling into the housing in a collector during operation of the dicing saw, wherein said step of collecting includes:
    mounting a sloping floor in said drainage channel; and
    causing debris falling on said sloping floor to slide into a receptacle coupled to the housing, and wherein said method further comprise the step of providing a pressurized fluid onto said sloping floor to urge debris into said receptacle.

* * * * *